United States Patent
Tezuna

(10) Patent No.: US 7,338,713 B2
(45) Date of Patent: Mar. 4, 2008

(54) PRIMER FOR ADHESIVE SHEETS, ARTICLE ATTACHED WITH AN ADHESIVE SHEET AND PROCESS FOR PRODUCING THE ARTICLE

(75) Inventor: Atsushi Tezuna, Nishikamo-gun (JP)

(73) Assignee: Lintec Corporation, Tokyo (JP)

( * ) Notice: Subject to any disclaimer, the term of this patent is extended or adjusted under 35 U.S.C. 154(b) by 110 days.

(21) Appl. No.: 10/281,617

(22) Filed: Oct. 28, 2002

(65) Prior Publication Data

US 2003/0104214 A1   Jun. 5, 2003

(30) Foreign Application Priority Data

Nov. 7, 2001   (JP)   ............... 2001-341973

(51) Int. Cl.
*B32B 27/00* (2006.01)
*C01J 9/00* (2006.01)

(52) U.S. Cl. ............ 428/422.8; 428/412; 428/422; 428/423.1; 428/480; 428/500; 521/115; 521/116

(58) Field of Classification Search ............ 428/423.1, 428/423.3, 343, 353, 355 R, 355 AC, 355 N, 428/345, 422.8, 412, 422, 480, 500; 521/115, 521/116

See application file for complete search history.

(56) References Cited

U.S. PATENT DOCUMENTS

| | | | | |
|---|---|---|---|---|
| 3,437,500 A | * | 4/1969 | Hennig et al. | ............... 406/252 |
| 4,443,519 A | * | 4/1984 | Donermeyer et al. | ........ 428/336 |
| 5,130,402 A | * | 7/1992 | Akiyama et al. | ............. 528/45 |
| 5,204,409 A | | 4/1993 | Arend et al. | |
| 5,916,941 A | * | 6/1999 | St. Clair | ..................... 524/321 |
| 6,284,708 B1 | * | 9/2001 | Oshima et al. | ............. 503/227 |

FOREIGN PATENT DOCUMENTS

| | | |
|---|---|---|
| EP | 0 499 113 A2 | 8/1992 |
| JP | 2001262114 A | 9/2001 |
| WO | WO 90/13416 A1 | 11/1990 |

* cited by examiner

*Primary Examiner*—Thao Tran
(74) *Attorney, Agent, or Firm*—Frishauf, Holtz, Goodman & Chick, P.C.

(57) ABSTRACT

A primer for adhesive sheets which comprises as a main component thereof an oligomer comprising a reaction product of a portion of an isocyanurate compound which is a trimer of tolylene diisocyanate and a polyol and has a number-average molecular weight in a range of 700 to 50,000; an article comprising an adhesive sheet attached to an adherend using a layer of the above primer as the intermediate layer; a process for producing an article attached with an adhesive sheet which comprises coating an adherend with the primer and attaching the adhesive sheet to the article when 1 minute to 24 hours has passed after the coating. Peeling and displacement of the adhesive sheet can be prevented and excellent properties can be maintained even when the adhesive sheet is attached to an article in a short time after the article is coated with the primer.

21 Claims, 2 Drawing Sheets

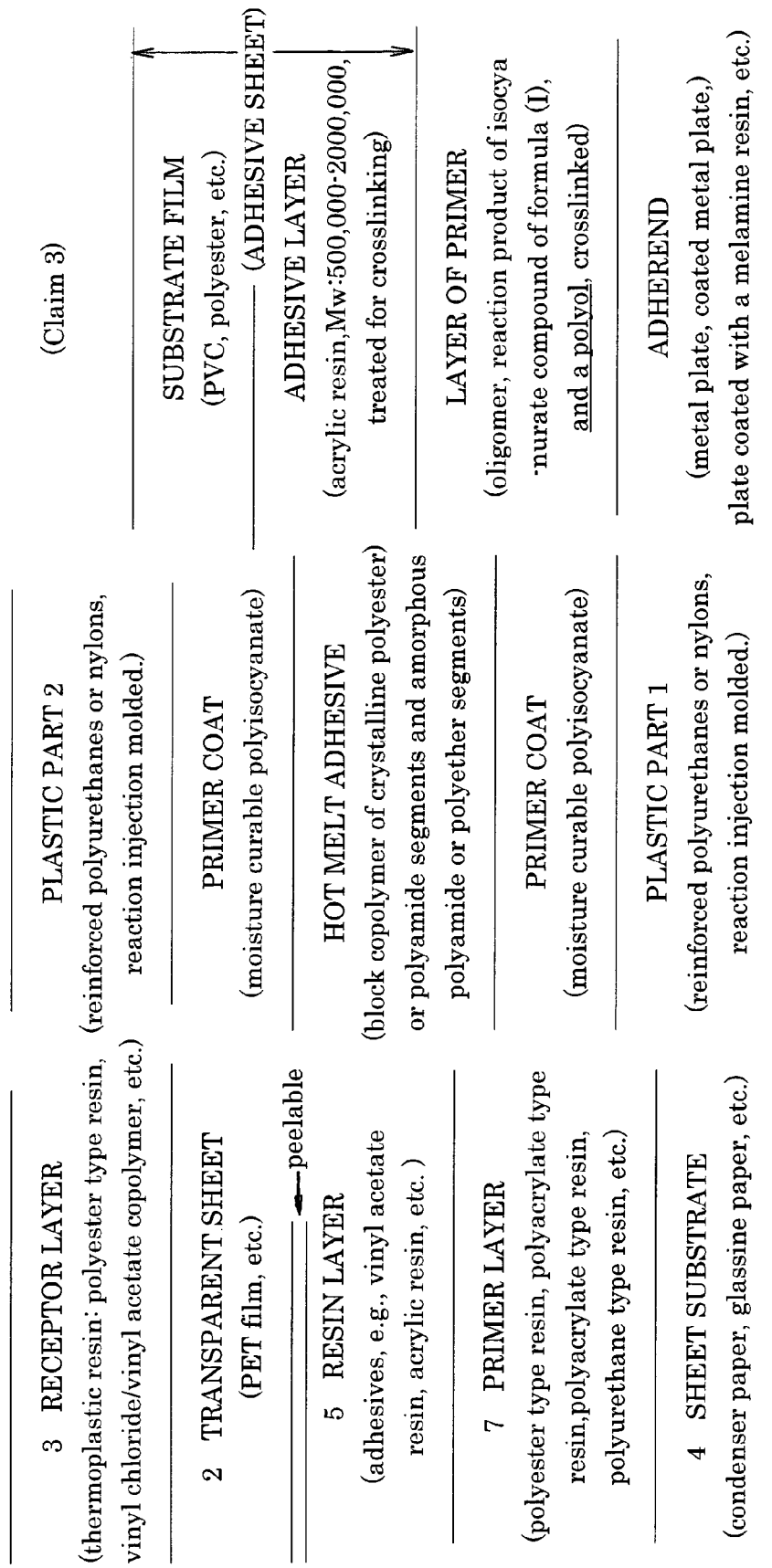
FIG. 1 SCHEMATIC COMPARISON AMONG Oshima et al., Donermeyer et al. and PRESENT INVENTION

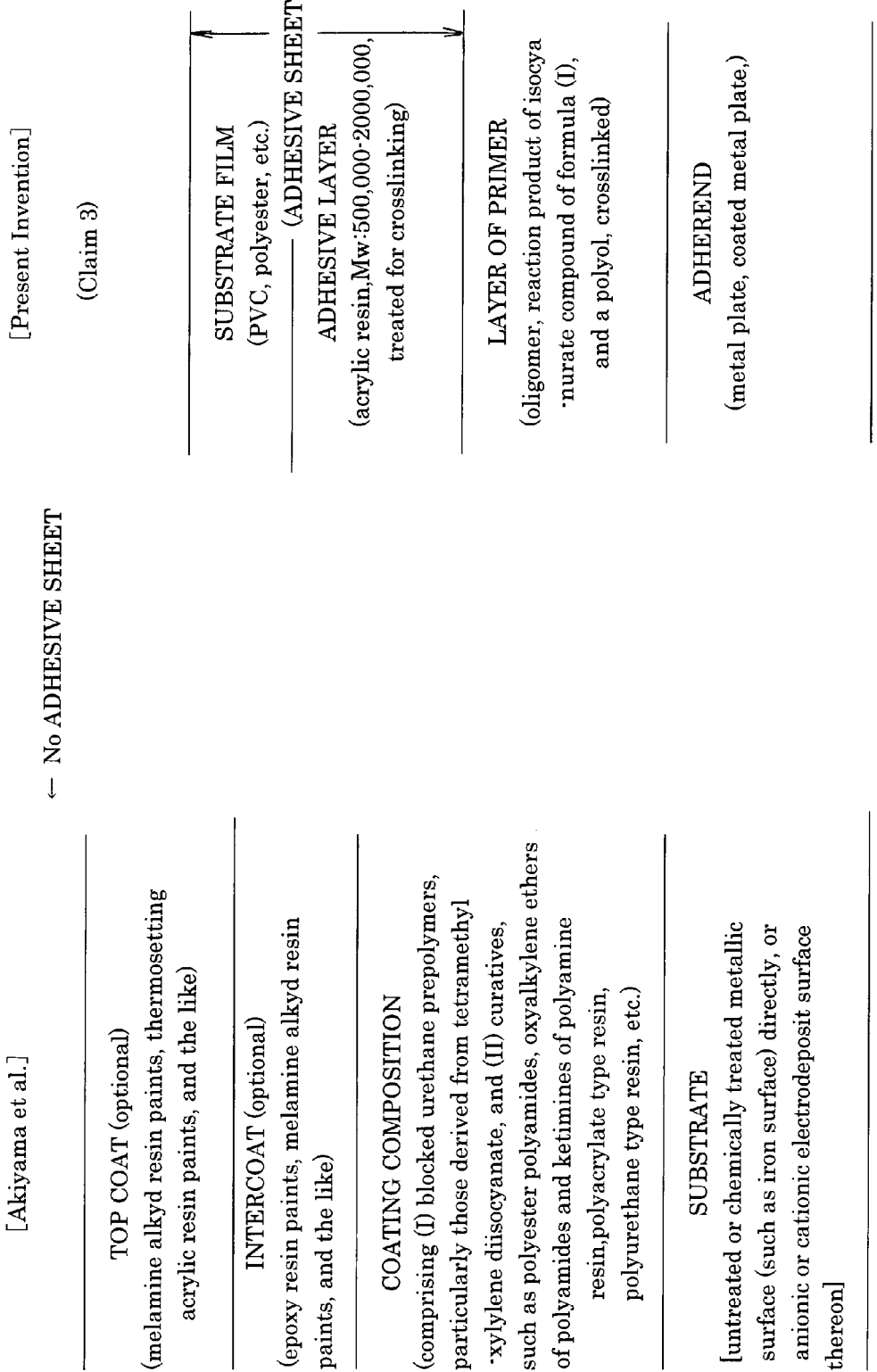

PRIMER FOR ADHESIVE SHEETS, ARTICLE ATTACHED WITH AN ADHESIVE SHEET AND PROCESS FOR PRODUCING THE ARTICLE

BACKGROUND OF THE INVENTION

1. Field of the Invention

The present invention relates to a primer for adhesive sheets, an article attached with an adhesive sheet and a process for producing the article. More particularly, the present invention relates to a primer for adhesive sheets which can prevent cleavage, peeling and displacement of the adhesive sheet, maintain excellent properties and be handled easily even when the adhesive sheet is attached to an adherend in a short time after the primer is applied to the adherend; an article attached with an adhesive sheet which is obtained by attaching the adhesive sheet to an adherend using the primer as the intermediate layer; and a process for producing the article attached with an adhesive sheet effectively.

2. Description of Related Art

Recently, adhesive sheets (including adhesive tapes; similarly, hereinafter) have been used widely in many fields. For example, adhesive sheets are used for packages and bindings, office and household uses, bonds, masks in coating, surface protection, sealing, corrosion prevention, shielding from water, electric insulation, electronic instruments, medical and hygienic materials, displays, marks, decorations and labels.

In the fields of displays, marks and decorations among the above applications of the adhesive sheets, the demand for adhesive sheets as the replacement for coating films, i.e., films formed in accordance with the coating process, has been increasing to achieve an improvement in productivity and a decrease in production cost of coated articles. For example, tapes for warning danger, line tapes and marking tapes are used for displaying and marking. In the field of decoration, adhesive sheets are used for interior and exterior decorations of show windows and buildings, decoration of automobiles and motor cycles with marking sheets and stickers and decoration of door sash portions of automobiles. Adhesive sheets having a substrate having the retroreflection property which reflects light to the direction of the incident light are used for marks for roads, railroads and related facilities as reflection sheets.

As the adherend to which an adhesive sheet is attached as the replacement for a coating film, various materials are used. For example, metal plates, coated metal plates, glass, ceramics, stone materials, wood materials, plastics and paper are used.

Since articles attached with an adhesive sheet as the replacement for a coating film are frequently used outdoors, it is necessary that both of the substrate and the adhesive have excellent weatherability and, in general, acrylic adhesives having excellent weatherability are used as the adhesive. It is preferable that the substrate has excellent weatherability and a small shrinkage and it is also preferable that rigidity is not excessively great from the standpoint of workability. Therefore, film substrates comprising, for example, polyvinyl chloride, polyesters, polypropylene, polyacrylates, polycarbonates, polytetrafluoroethylene and thermoplastic polyurethanes are used. From the standpoint of economy, film substrates comprising polyvinyl chloride are frequently used at present.

It is required that the article attached with the adhesive sheet as the replacement for a coating film do not show cleavage, peeling or displacement of the adhesive sheet for a long time.

It is considered that cleavage, peeling and displacement of the adhesive sheet with passage of time are caused, for example, by (1) separation at the interface of the substrate and the adhesive layer, (2) a decrease in the ability of the adhesive itself to hold the sheet and (3) separation at the interface of the adhesive layer and the adherend. The problem caused by (1) can be overcome, for example, by treating the substrate by corona discharge. The problem caused by (2) can be overcome by using an adhesive having a greater holding ability. To overcome the problem caused by (3), the adherend may be coated with a primer and the adhesive sheet may be attached to the primer. However, it is the actual situation at present that no satisfactory primer for adhesive sheets can be found.

The properties required for the primer used for attaching an adhesive sheet as the replacement for a coating film to an adherend are as follows: (1) cleavage, peeling and displacement of the adhesive sheet can be prevented even when the adhesive sheet is attached in a short time after the primer is applied to the adherend and the primer exhibit the excellent effect of maintaining the property; (2) the primer has an excellent coating property and, for example, can be applied by a felt pen; and (3) the primer is a one-part composition which spontaneously dries or is cured with moisture and does not require any specific apparatus such as a drier.

SUMMARY OF THE INVENTION

The present invention has an object of providing a primer for adhesive sheets which is used for attaching an adhesive sheet and, in particular, an adhesive sheet as the replacement for a coating film to an adherend and satisfies the requirements described above, an article attached with the adhesive sheet and a process for producing the article.

As the result of extensive studies by the present inventor to achieve the above object, it was found that a primer comprising a polyisocyanate-based oligomer having a specific structure and a specific molecular weight as the main component was suitable for achieving the object and the desired article attached with the adhesive sheet could be effectively obtained by attaching the adhesive sheet within a specific time. The present invention has been completed based on the knowledge.

The present invention provides:

(1) A primer for adhesive sheets comprising as a main component thereof an oligomer which comprises a reaction product of a portion of an isocyanurate compound which is a trimer of tolylene diisocyanate and a polyol and has a number-average molecular weight in a range of 700 to 50,000;

(2) A primer described in (1), wherein an average number of isocyanate group in one molecule of the oligomer is in a range of 2 to 100;

(3) An article attached with an adhesive sheet, the article comprising the adhesive sheet attached to an adherend using a layer of a primer described in any one of (1) and (2) as an intermediate layer;

(4) An article described in (3), wherein the adhesive sheet has at least on one face of a substrate a layer comprising an acrylic adhesive which comprises an acrylic resin having a weight-average molecular weight in a range of 500,000 to 2,000,000 and has been treated for crosslinking;

(5) A process for producing an article attached with an adhesive sheet, the process comprising coating an adherend with a primer described in any one of (1) and (2) and attaching the adhesive sheet to a coating layer of the primer when 1 minute to 24 hours has passed after the coating with the primer; and (6) A process described in (5), wherein the adhesive sheet is attached to the coating layer of the primer when 2 to 60 minutes has passed after the coating with the primer.

DESCRIPTION OF THE PREFERRED EMBODIMENTS

The primer for adhesive sheets of the present invention is used, in particular, for attaching an adhesive sheet to an adherend as the replacement for a coating film and comprises as the main component thereof an oligomer which comprises a reaction product of a portion of an isocyanurate compound which is a trimer of tolylene diisocyanate and a polyol. The isocyanurate compound is expressed by the following formula (I):

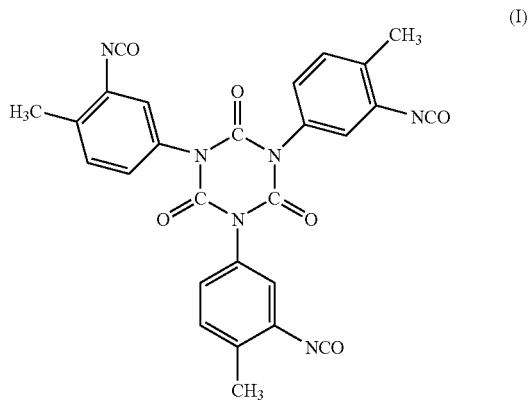

As the polyol reacting with the isocyanurate compound, aliphatic compounds having two or more hydroxyl groups in the molecule are preferable. Examples of the polyol include diols such as ethylene glycol, 1,3-propanediol, 1,4-butanediol, 1,6-hexanediol, neopentyl glycol, polyethylene glycol, polypropylene glycol and polytetramethylene glycol; and polyhydric alcohols having three of more hydroxyl groups such as glycerol, trimethylolpropane, trimethylolethane, pentaerythritol and dimers of these compounds.

In the reaction of the isocyanurate compound which is a trimer of tolylene diisocyanate and the polyol, it is important that the isocyanurate compound is used in an amount greater than the stoichiometric amount and isocyanate group is present in the obtained oligomer. Due to this structure, the primer can be provided with the property of curing with moisture.

The molecular weight of the oligomer which is the reaction product of a portion of the isocyanurate compound formed as described above and the polyol is in the range of 700 to 50,000, preferably in the range of 700 to 10,000, more preferably in the range of 700 to 7,000 and most preferably 1,000 to 4,000 as the number-average molecular weight. The number-average molecular weight is a value obtained by the measurement in accordance with the gel permeation chromatography (GPC) and expressed as the value of the corresponding polystyrene. When the number-average molecular weight is in the above range, the formed coating layer can be easily brought into the tack-free condition (the condition giving no sticky feeling when the surface of the applied primer is touched with fingers) within 2 minutes after being applied and the properties described above can be satisfied, i.e., (1) cleavage, peeling and displacement of the adhesive sheet can be prevented even when the adhesive sheet is attached in a short time after the primer is applied to the adherend and the primer can maintain the excellent property for a long time; (2) the primer has an excellent coating property and, for example, can be applied by a felt pen; and (3) the primer is a one-part composition which can be spontaneously dried or cured with moisture and does not require any specific apparatus such as a drier.

It is preferable that the above oligomer has 2 to 100 isocyanate groups and preferably 4 to 50 isocyanate groups in average in one molecule from the standpoint of the property of curing with moisture and the properties as the primer.

The primer of the present invention comprises the oligomer as the main component thereof in a suitable organic solvent which dissolves the oligomer and is inert to isocyanate group. Examples of the organic solvent include hydrocarbon-based solvents such as benzene, toluene and xylene; ester-based solvents such as ethyl acetate and butyl acetate; ketone-based solvents such as methyl ethyl ketone and methyl isobutyl ketone; and mixtures of these solvents. Where desired, other polyisocyanate compounds and various types of additives conventionally used for primers can be added as long as these components do not affect the object of the present invention adversely.

Examples of the other polyisocyanate compound include aromatic diisocyanates excluding tolylene diisocyanate such as diphenylmethane diisocyanate and xylylene diisocyanate; aliphatic diisocyanates such as hexamethylene diisocyanate; alicyclic diisocyanates such as isophorone diisocyanate and hydrogenated diphenylmethane diisocyanate; adduct compounds and isocyanurate compounds of these compounds; reaction products of the isocyanurate compounds with polyols; isocyanurate compounds of tolylene diisocyanate, adducts thereof or a mixture of two or three types of diisocyanate compounds; and reaction products of the above isocyanurate compounds with polyols.

In the primer of the present invention, the concentration of solid substances is not particularly limited as long as the primer has a viscosity such that the primer can be applied to an adherend using a felt pen or the like tool.

The primer for adhesive sheets of the present invention exhibiting the following properties can be obtained as described below.

A plate coated with a melamine resin is coated with the primer in an amount such that the thickness was 5 μm after being dried. When 2 minutes has passed after the coating, an adhesive sheet is attached to the plate coated with the primer. The adhesive sheet has a polyvinyl chloride film having a thickness of 100 μm as the substrate and an acrylic adhesive layer on one face thereof and exhibits an adhesive strength to a stainless steel plate of 15.0 to 30.0 N/25 mm as measured in accordance with Japanese Industrial Standard Z 0237 at a time 30 minutes after being adhered and a holding power to a stainless steel plate of 70,000 seconds or longer as measured in accordance with Japanese Industrial Standard Z 0237 at a time 30 minutes after being adhered. The prepared combination is aged at a temperature of 23° C. and a relative humidity of 50% for 3 hours and a sample is obtained. The obtained sample exhibits a holding time of 500 minutes or longer in the creep test at 80° C.

The above test methods of the properties of the primer will be described more specifically in the following. The acrylic adhesive sheet used as the standard adhesive sheet in the above test has a polyvinyl chloride film having a thickness of 100 µm as the substrate and an acrylic adhesive layer having a thickness of about 30 µm placed on the substrate and exhibits an adhesive strength to a stainless steel plate (a plate of SUS 304 the surface of which has been polished with a No. 360 water-resistant polishing paper) in the range of 15.0 to 30.0 N/25 mm as measured in accordance with Japanese Industrial Standard Z 0237 at a time 30 minutes after being adhered and a holding power to a stainless steel plate (the same plate as that described above) of 70,000 seconds or longer as measured in accordance with Japanese Industrial Standard Z 0237 at a time 30 minutes after being adhered. As the acrylic adhesive sheet having the above properties, FUJI PAINT BK 6302T2 [a trade name; manufactured by LINTEC Corporation] can be used.

A plate coated with a melamine resin is coated with the primer of the present invention using a felt pen in an amount such that the thickness is 5 µm after being dried. When 2 minutes has passed after the coating, in accordance with Japanese Industrial Standard Z 0237, the above standard acrylic adhesive sheet having a width of 10 mm is attached to the primer formed on the plate coated with a melamine resin under a pressure of attachment of 29.4 N in a manner such that the area of adhesion has a width of 10 mm and a length of 10 mm. The prepared combination is aged at a temperature of 23° C. and a relative humidity of 50% for 3 hours and a sample for the measurement of holding power is obtained. Using the obtained sample, the creep test is conducted in accordance with Japanese Industrial Standard Z 0237 at 80° C. in a dry environment under a load of 20.6 N and the holding power is measured. The test is conducted using 3 samples for the measurement of holding power and the average of the three measurements is obtained (n=3).

The primer of the present invention is characterized in that a very great holding power is exhibited even when the adhesive sheet is attached at a short time after the primer is applied to the adherend. For example, when the acrylic adhesive sheet is attached when 2 minutes to 1 hours has passed after the application of the primer, a holding power of 7,000 minutes or longer can be exhibited. As the time between the application of the primer and the attachment of the adhesive sheet increases, the holding power decreases. However, even when the acrylic adhesive sheet is attached when 12 hours has passed after the application of the primer, a practically sufficient holding power of 1,000 minutes or longer can be exhibited.

The primer of the present invention exhibits a great holding power to the adhesive sheet and, in particular, to the acrylic adhesive sheet and the excellent effect of maintaining the holding power. Therefore, cleavage, peeling and displacement of the adhesive sheet can be prevented for a long time.

As the adhesive sheet with which the primer of the present invention is used in combination, acrylic adhesive sheets are preferable since the primer can effectively exhibit the desired function. It is preferable that the acrylic adhesive sheet has at least on one face thereof a layer comprising an acrylic adhesive which comprises an acrylic resin having a weight-average molecular weight in the range of 500,000 to 2,000,000 and preferably in the range of 700,000 to 1,700,000 and has been treated by crosslinking. When the weight-average molecular weight is within the above range, the adhesive sheet having an excellent balance between the adhesive strength and the holding power can be obtained.

The weight-average molecular weight is a value obtained by the measurement in accordance with the gel permeation chromatography (GPC) and expressed as the value of the corresponding polystyrene.

As the acrylic resin comprised in the acrylic adhesive, (meth)acrylic ester-based copolymers are used. As the (meth)acrylic ester-based copolymer, copolymers of a (meth)acrylic ester in which an alkyl group in the ester portion has 1 to 20 carbon atoms, a monomer having a functional group having active hydrogen and other monomers which are used where desired are preferable.

Examples of the (meth)acrylic ester in which an alkyl group in the ester portion has 1 to 20 carbon atoms include methyl (meth)acrylate, ethyl (meth)acrylate, propyl (meth)acrylate, butyl (meth)acrylate, pentyl (meth)acrylate, hexyl (meth)acrylate, cyclohexyl (meth)acrylate, 2-ethylhexyl (meth)acrylate, isooctyl (meth)acrylate, decyl (meth)acrylate, dodecyl (meth)acrylate, myristyl (meth)acrylate, palmityl (meth)acrylate and stearyl (meth)acrylate. The (meth)acrylic esters may be used singly or in combination of two or more.

Examples of the monomer having a functional group having active hydrogen include hydroxyalkyl esters of (meth)acrylic acid such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate and 4-hydroxybutyl (meth)acrylate; acrylamides such as acrylamide, methacrylamide, N-methacrylamide, N-methylmethacrylamide, N-methylolacrylamide and N-methylolmethacrylamide; monoalkylaminoalkyl (meth)acrylates such as monomethylaminoethyl (meth)acrylate, monoethylaminoethyl (meth)acrylate, monomethylaminopropyl (meth)acrylate and monoethylaminopropyl (meth)acrylate; and ethylenically unsaturated carboxylic acids such as acrylic acid, methacrylic acid, crotonic acid, maleic acid, itaconic acid and citraconic acid. The above monomers may be used singly or in a combination of two or more.

Examples of the other monomers which are used where desired include vinyl esters such as vinyl acetate and vinyl propionate; olefins such as ethylene, propylene and isobutylene; halogenated olefins such as vinyl chloride and vinylidene chloride; styrenic monomers such as styrene and α-methylstyrene; diene-based monomers such as butadiene, isoprene and chloroprene; nitrile-based monomers such as acrylonitrile and methacrylonitrile; and N,N-dialkyl-substituted acrylamides such as N,N-dimethylacrylamide and N,N-dimethylmethacrylamide. The above monomers may be used singly or in combination of two or more.

In the acrylic adhesive, the form of copolymerization in the (meth)acrylic ester-based copolymer used as a resin component is not particularly limited and any of random copolymers, block copolymers and graft copolymers can be used.

In the present invention, the (meth)acrylic ester-based copolymers may be used singly or in combination of two or more.

As the acrylic adhesive, an adhesive treated by crosslinking is preferable. The crosslinking agent used for the crosslinking treatment is not particularly limited and a crosslinking agent can be suitably selected from crosslinking agents conventionally used for acrylic adhesives. Examples of the crosslinking agent include polyisocyanate compounds, epoxy resins, melamine resins, urea resins, dialdehydes, methylol polymers, metal chelate compounds, metal alkoxides and metal salts. Polyisocyanates are preferable among these crosslinking agents.

Examples of the polyisocyanate include aromatic polyisocyanates such as tolylene diisocyanate, diphenylmethane diisocyanate and xylylene diisocyanate; aliphatic polyisocyanates such as hexamethylene diisocyanate; alicyclic polyisocyanates such as isophorone diisocyanate and hydrogenated diphenylmethane diisocyanate; biuret compounds and isocyanurates of these compounds; and adduct compounds which are reaction products of these compounds with low molecular weight compounds having active hydrogen such as ethylene glycol, propylene glycol, neopentyl glycol, trimethylolpropane and castor oil.

In the present invention, the crosslinking agents may be used singly or in combination of two or more. The amount of the crosslinking agent is, in general, in the range of 0.01 to 20 parts by weight and preferably in the range of 0.1 to 10 parts by weight per 100 parts by weight of the above (meth)acrylic ester-based copolymer although the amount is different depending on the type of the crosslinking agent.

To the acrylic adhesive, tackifiers, antioxidants, ultraviolet light absorbents, photostabilizers, softeners, silane coupling agents and fillers can be added where desired.

In the present invention, since the above acrylic adhesive sheet is mainly used as the adhesive sheet as the replacement for a coating film, it is preferable that the substrate has excellent weatherability and a small shrinkage and it is also preferable that rigidity is not excessively great from the standpoint of workability. Therefore, sheet substrates comprising polyvinyl chloride resins, polyesters, polypropylene, polyacrylates, polycarbonates, polytetrafluoroethylene and thermoplastic polyurethanes are preferable. Among these substrates, sheets of vinyl chloride-based resins and, in particular, sheets of vinyl chloride-based resins prepared in accordance with the casting process and having a small shrinkage are preferable from the standpoint of economy. It is preferable that the substrate is treated by corona discharge or formation of a primer so that adhesion with the adhesive layer is enhanced.

The thickness of the substrate is selected, in general, in the range of 10 to 300 μm and preferably in the range of 30 to 200 μm although the thickness is different depending on the application of the adhesive sheet. The thickness of the adhesive layer formed at least on one face of the substrate is selected, in general, in the range of 5 to 100 μm and preferably in the range of 10 to 60 μm.

The article attached with an adhesive sheet of the present invention comprises an adherend attached with the adhesive sheet using a layer comprising the above primer as the intermediate layer. As the adhesive sheet, an acrylic adhesive sheet is preferable.

The adherend is not particularly limited. Examples of the adherend include films, sheets and structured articles comprising metals, coated metals, glass, ceramics, stone materials, wood materials, plastics and paper. The present invention can be advantageously applied to coated metal plates among the above adherends.

Examples of the article attached with the adhesive sheet include articles to which the adhesive sheet is attached as a replacement for a coating film such as articles to which adhesive sheets for displaying and marking or adhesive sheets for decoration are attached. Specific examples of the article include articles for displaying and marking to which adhesive sheets are attached as tapes for warning danger, line tapes and marking tapes; articles to which adhesive sheets used for interior and exterior decorations of show windows and buildings, decoration of automobiles and motor cycles with marking sheets and stickers and decoration of door sash portions of automobiles are attached; and articles to which adhesive sheets having a substrate having the retroreflection property are attached to marks for roads, railroads and related facilities as reflection sheets. Preferable examples among these articles include decorative articles for door sash portions of automobiles comprising an acrylic adhesive sheet attached to a coated metal plate using the primer of the present invention as the intermediate layer.

At the door sash portion of an automobile, the adhesive sheet tends to be cleaved, peeled or displaced due to shear loads at the time of opening and closing the door. When the adhesive sheet is attached to the portion described above as the replacement for a coating film using the primer of the present invention as the intermediate layer, cleavage, peeling and displacement of the adhesive sheet can be prevented for a long time.

The article attached with the adhesive sheet can be produced effectively in accordance with the process of the present invention.

In the process of the present invention, the above primer of the present invention is applied to an adherend using a felt pen or the like in an amount such that the thickness is about 3 to 15 μm after being dried. When 2 minutes to 24 hours has passed after the coating, an adhesive sheet which is preferably an acrylic adhesive sheet is attached. When the adhesive sheet is attached at a time between 2 minutes to 1 hour after the application of the primer, the holding power shows little change and a very great holding power can be exhibited. As the time between the application of the primer and the attachment of the adhesive sheet increases, the holding power decreases. However, even when the acrylic adhesive sheet is attached when 24 hours has passed after the application of the primer, a practically sufficient holding power can be exhibited. Therefore, it is preferable that the time between the application of the primer and the attachment of the adhesive sheet is in the range of 2 minutes to 12 hours, more preferably in the range of 2 minutes to 2 hours and most preferably in the range of 2 minutes to 1 hour. When an article attached with an adhesive sheet is produced, in about 99% of the cases, the adhesive sheet is attached to the article when 2 minutes to 1 hour has passed after the primer is applied from the standpoint of productivity. In general, the primer is brought into the tack-free condition within 2 minutes after the application. When the time exceeds 24 hours after the application of the primer, it is sufficient that the primer is applied again and then the adhesive sheet is attached.

To summarize the advantages of the present invention, in accordance with the present invention, cleavage, peeling and displacement of the adhesive sheet can be prevented and excellent properties can be maintained even when the adhesive sheet is attached to an article in a short time after the article is coated with the primer.

The primer of the present invention can be used particularly advantageously in combination with acrylic adhesive sheets as the replacement for a coating film.

EXAMPLES

The present invention will be described more specifically with reference to examples in the following. However, the present invention is not limited to the examples.

The properties of the primers obtained in Examples were obtained in accordance with the methods described above.

The acrylic adhesive sheet used in Examples [manufactured by LINTEC Corporation; FUJI PAINT BK6302 T2; an adhesive sheet having, on one face of a vinyl chloride resin film having a thickness of 100 μm, a layer of an acrylic adhesive which had a thickness of 30 μm, contained an acrylic resin having a weight-average molecular weight of 800,000 and was treated for crosslinking] had an adhesive strength of 18.0 N/25 mm and a holding power of 70,000 seconds or longer as measured in the conditions described above in the specification.

Example 1

A solution containing an oligomer which was composed of a reaction product of an isocyanurate compound which was a trimer of tolylene diisocyanate and a polyol and had a number-average molecular weight of 2,700 (the average number of isocyanate group in one molecule: 4.8) [manufactured by NIPPON POLYURETHANE Co., Ltd.; the trade name: CORONATE 341, the concentration of solid substances: 50% by weight] was diluted with methyl ethyl ketone and a primer having a concentration of solid substances of 30% by weight was prepared.

Using the prepared primer, an acrylic adhesive sheet [manufactured by LINTEC Corporation; FUJI PAINT BK6302 T2] was attached and the holding power was obtained. The result is shown in Table 1.

The primer was in the tack-free condition within 2 minutes after being applied.

Comparative Example 1

A solution containing an isocyanurate compound which was obtained from tolylene diisocyanate and hexamethylene diisocyanate and expressed by the following formula (II) [manufactured by SUMITOMO BAYER URETHANE Co., Ltd.; the trade name: DESMODUR HLBA; the concentration of solid substances: 60% by weight] was diluted with methyl ethyl ketone and a primer having a concentration of solid substances of 30% by weight was prepared.

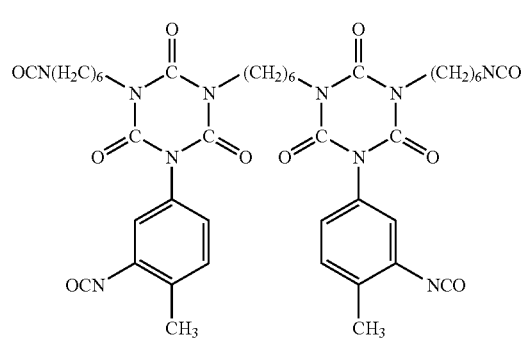

(II)

Using the prepared primer, an acrylic adhesive sheet [manufactured by LINTEC Corporation; FUJI PAINT BK6302 T2] was attached and the holding power was obtained. The result is shown in Table 1.

The primer was in the tack-free condition within 2 minutes after being applied.

TABLE 1

|  | Time between application of primer and attachment of adhesive sheet | Holding power [holding time] (minute) |
| --- | --- | --- |
| Example 1 | 2 minutes | >7,200 |
|  | 30 minutes | >7,200 |

TABLE 1-continued

|  | Time between application of primer and attachment of adhesive sheet | Holding power [holding time] (minute) |
| --- | --- | --- |
|  | 1 hour | >7,200 |
|  | 2 hours | 1,300 |
|  | 12 hours | 1,100 |
|  | 24 hours | 900 |
| Comparative Example 1 | 2 minutes | 50 |
|  | 30 minutes | 70 |
|  | 1 hour | 130 |
|  | 2 hours | 310 |
|  | 12 hours | 1,150 |
|  | 24 hours | 1,300 |
| Comparative Example 2 | 2 minutes | 10 |
| Reference Example 1 | no primer applied | 2 |

Comparative Example 2

A solution containing an adduct compound of tolylene diisocyanate with trimethylolpropane which was expressed by the following formula (III) [manufactured by NIPPON POLYURETHANE Co., Ltd.; the trade name: CORONATE L; the concentration of solid substances: 75% by weight] was diluted with ethyl acetate and a primer having a concentration of solid substances of 37.5% was prepared.

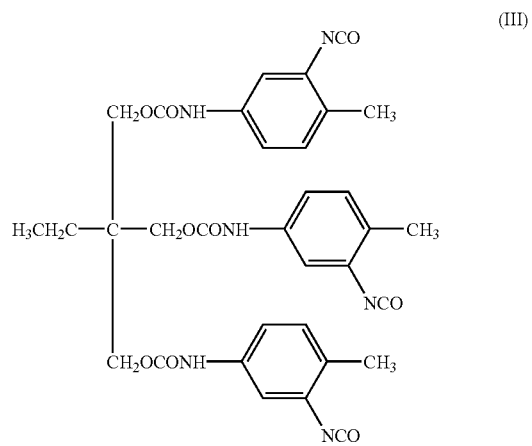

(III)

Using the prepared primer, an acrylic adhesive sheet [manufactured by LINTEC Corporation; FUJI PAINT BK6302 T2] was attached and the holding power was obtained when 2 minutes had passed after the application of the primer. The holding power was 10 minutes. The result is shown in Table 1.

The primer was in the tack-free condition within 2 minutes after being applied.

Reference Example 1

An acrylic adhesive sheet [manufactured by LINTEC Corporation; FUJI PAINT BK6302 T2] was attached to a plate coated with a melamine resin without coating the plate with a primer and the holding power was obtained in accordance with the same procedures as those conducted above. The holding power was 2 minutes. The result is shown in Table 1.

What is claimed is:

1. A primer for coating a surface of an adherend before attaching an adhesive sheet to said adherend, the primer comprising as a main component thereof an oligomer and an organic solvent which dissolves said oligomer and is inert to an isocyanate group, said oligomer consisting essentially of a reaction product of (i) an isocyanurate compound which is a trimer of tolylene diisocyanate, said isocyanurate compound being represented by formula (I):

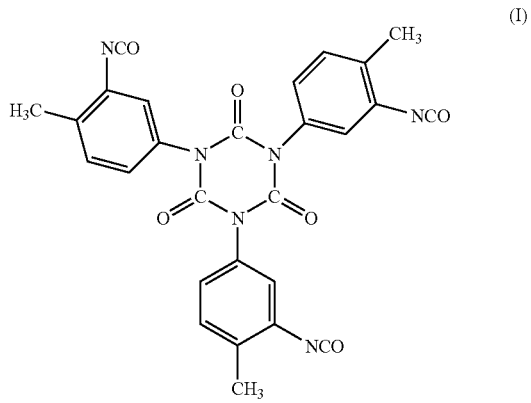

and (ii) a polyol, wherein said polyol is selected from the group consisting of (a) a diol selected from the group consisting of ethylene glycol, 1,3-propanediol, 1,4-butanediol, 1,6-hexanediol, neopentyl glycol, polyethylene glycol, polypropylene glycol and polytetramethylene glycol; and (b) a polyhydric alcohol having three or more hydroxyl groups, the polyhydric alcohol being selected from the group consisting of glycerol, trimethylolpropane, trimethylolethane, pentaerythritol and dimers thereof, and wherein said reaction product has isocyanate groups and has a number-average molecular weight in a range of 700 to 50,000, and wherein an average number of the isocyanate groups in one molecule of said reaction product is 2 to 100.

2. An article comprising an adherend, a layer of a dried primer which is formed by applying the primer of claim 1 on a surface of said adherend and subsequently drying said primer and an adhesive sheet which comprises a substrate film and a layer of an adhesive resin formed on at least a surface of said substrate, said adhesive sheet being attached in a manner such that a surface of said layer of adhesive resin attaches on a surface of said layer of the dried primer, wherein said adhesive resin comprises an acrylic adhesive resin having a weight-average molecular weight in a range of 500,000 to 2,000,000 and has been treated for crosslinking.

3. The article according to claim 2, wherein the acrylic adhesive resin is a copolymer of a (meth)acrylic ester having 1-20 carbon atoms in an alkyl group in an ester portion thereof and a monomer having a functional group having active hydrogen.

4. The article according to claim 3, wherein the (meth) acrylic ester is selected from the group consisting of methyl (meth)acrylate, ethyl (meth)acrylate, propyl (meth)acrylate, butyl (meth)acrylate, pentyl (meth)acrylate, hexyl (meth) acrylate, cyclohexyl (meth)acrylate, 2-ethylhexyl (meth) acrylate, isooctyl (meth)acrylate, decyl (meth)acrylate, dodecyl (meth)acrylate, myristyl (meth)acrylate, palmityl (meth)acrylate and stearyl (meth)acrylate.

5. The article according to claim 4, wherein the monomer having a functional group having active hydrogen is selected from the group consisting of 2-hydroxyethyl-(meth)acrylate, 2-hydroxypropyl (meth)acrylate, 3-hydroxypropyl (meth) acrylate, 2-hydroxybutyl (meth)acrylate, 3-hydroxybutyl (meth)acrylate, 4-hydroxybutyl (meth)acrylate, acrylamide, methacrylamide, N-methylacrylamide, N-methylmethacrylamide, N-methylolacrylamide, N-methylol-methacrylamide, monomethyl-aminoethyl (meth)acrylate, monoethylaminoethyl (meth)acrylate, monomethylaminopropyl (meth)acrylate, monoethylaminopropyl (meth)acrylate, acrylic acid, methacrylic acid, crotonic acid, maleic acid, itaconic acid and citraconic acid.

6. An article according to claim 5, wherein the crosslinking is carried out with at least one compound selected from the group consisting of (i) an isocyanate compound selected from the group consisting of tolylene diisocyanate, diphenylmethane diisocyanate, xylylene diisocyanate, hexamethylene diisocyanate, isophorone diisocyanate and hydrogenated diphenylmethane diisocyanate, (ii) a biuret compound of said isocyanate compound, (iii) an isocyanurate of said isocyanate compound, and (iv) an adduct compound which is a reaction product of said isocyanate compound and a low molecular weight compound having active hydrogen selected from the group consisting of ethylene glycol, propylene glycol, neopentyl glycol, trimethylolpropane and castor oil; and wherein said crosslinking agent is contained in the copolymer of (meth)acrylic ester in an amount of 0.01 to 20 parts by weight per 100 parts by weight of the copolymer of the (meth)acrylic ester.

7. An article according to claim 3, wherein the crosslinking is carried out with at least one crosslinking agent selected from the group consisting of a polyisocyanate compound, an epoxy resin, a melamine resin, a urea resin, a dialdehyde, a methylol polymer, a metal chelate compound, a metal alkoxide and a metal salt.

8. An article according to claim 7, wherein the crosslinking agent is at least one compound selected from the group consisting of (i) an isocyanate compound selected from the group consisting of tolylene diisocyanate, diphenylmethane diisocyanate, xylylene diisocyanate, hexamethylene diisocyanate, isophorone diisocyanate and hydrogenated diphenylmethane diisocyanate, (ii) a biuret compound of said isocyanate compound, (iii) an isocyanurate of said isocyanate compound, and (iv) an adduct compound which is a reaction product of said isocyanate compound and a low molecular weight compound having active hydrogen selected from the group consisting of ethylene glycol, propylene glycol, neopentyl glycol, trimethylolpropane and castor oil; and wherein said crosslinking agent is contained in the copolymer of (meth)acrylic ester in an amount of 0.01 to 20 parts by weight per 100 parts by weight of the copolymer of the (meth)acrylic ester.

9. The article according to claim 2, wherein the substrate is a sheet substrate comprising a polymer selected from the group consisting of a polyvinyl chloride resin, a polyester, polypropylene, a polyacrylate, a polycarbonate, polytetrafluoroethylene and a thermoplastic polyurethane.

10. The article according to claim 9, wherein the substrate is a sheet of a polyvinyl chloride-based resin prepared in accordance with a casting process.

11. The article according to claim 2, wherein the acrylic resin has a weight-average molecular weight of 700,000 to 1,700,000.

12. The article according to claim 2, wherein the substrate is in a thickness of 10 to 300 μm and the adhesive layer is in a thickness of 5 to 100 μm.

13. An article according to claim 2, wherein the adherend is a coated metal plate.

14. An article according to claim 2, wherein the adhesive sheet is an adhesive sheet for replacement of a film formed by a coating process.

15. An article according to claim 2, wherein the adhesive sheet is an adhesive sheet for decoration of a door sash portion of an automobile.

16. An article according to claim 2, wherein the adherend is a plate coated with a melamine resin.

17. The primer according to claim 1, wherein the reaction product has an average of 4 to 50 isocyanate groups in one molecule.

18. The primer according to claim 1, wherein the number-average molecular weight of the reaction product is 700 to 10,000.

19. A primer according to claim 1, wherein said primer is dissolved in at least one solvent selected from the group consisting of ethyl acetate, butyl acetate, methyl ethyl ketone and methyl isobutyl ketone.

20. An article comprising:

a plate coated with a melamine resin as an adherend, a layer of a primer which is formed on a surface of said plate and cured with moisture, the primer comprising as a main component thereof an oligomer comprising a reaction product of an isocyanurate compound which is a trimer of tolylene diisocyanate, said isocyanurate compound being represented by formula (I):

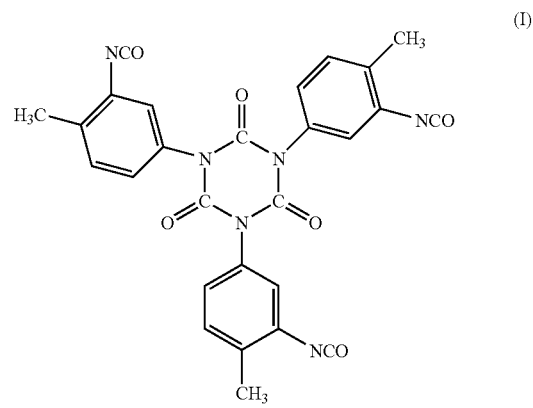

and a polyol, wherein said reaction product has isocyanate groups and has a number-average molecular weight in a range of 700 to 50,000, and wherein an average number of the isocyanate groups in one molecule of said reaction product is in a range of 2 to 100 and an adhesive sheet which comprises a substrate film and a layer of an adhesive resin formed on at least a surface of said substrate, said adhesive sheet being attached in a manner such that a surface of said layer of the adhesive resin attaches on a surface of said layer of the primer.

21. The article according to claim 20, wherein a holding time of the adhesive sheet attached to the layer of the primer measured at 80° C. in accordance with Japanese Industrial Standard Z 0237 is 500 minutes or more.

* * * * *